United States Patent [19]

Karll et al.

[11] 4,070,402

[45] Jan. 24, 1978

[54] TERPOLYMER ALKYLATED PHENOL

[75] Inventors: Robert E. Karll, Batavia, Ill.; Edmund J. Piasek, deceased, late of Chicago, Ill.; by Evelyn W. Hunt, administratrix, Hoffman Estates, Ill.

[73] Assignee: Standard Oil Company, Chicago, Ill.

[21] Appl. No.: 667,197

[22] Filed: Mar. 15, 1976

[51] Int. Cl.$^2$ .................. C07C 37/14; C07C 39/12; C07C 39/17; C07C 39/18
[52] U.S. Cl. .................. 260/619 D; 260/619 B; 260/620; 260/624 C
[58] Field of Search ............... 260/619 B, 619 D, 620, 260/624 C

[56] References Cited

U.S. PATENT DOCUMENTS

| 3,873,627 | 3/1975 | Lee et al. | 260/620 |
| 3,876,709 | 4/1975 | Lee et al. | 260/619 R |

FOREIGN PATENT DOCUMENTS

| 1,159,368 | 4/1966 | United Kingdom | 260/624 C |

*Primary Examiner*—Norman Morgenstern
*Attorney, Agent, or Firm*—Fred R. Ahlers; Arthur G. Gilkes; William T. McClain

[57] ABSTRACT

Phenols alkylated with high molecular weight ethylene-propylene-diene terpolymers are obtained in essentially quantitative yields and with no measurable fragmentation of terpolymer by reacting terpolymer with a large excess of phenol, in the presence of BF$_3$ as catalyst, at alkylation temperatures of about 170°–300° F. The preferred terpolymers consist essentially of about 35–45 mole percent propylene, 65–55 mole percent ethylene, and about 1.0–2.5 mole percent of a 5-alkenyl-2-norbornene such as 5-ethylidene-2-norbornene. The novel terpolymer alkylated phenol compositions are useful as intermediates for the preparation of multifunctional addition agents for lubricating oils, for example addition agents having combined dispersant-viscosity index improving properties.

9 Claims, No Drawings

TERPOLYMER ALKYLATED PHENOL

BACKGROUND OF THE INVENTION

This invention relates to phenols alkylated with high molecular weight terpolymers and to the preparation of such alkylated phenols. More particularly this invention relates to phenols alkylated with ethylene-propylene-diene terpolymers which are novel and useful intermediates for the preparation of multifunctional additives for lubricating oils.

The alkylation of phenol with low molecular weight polymers, particularly with homopolymers of $C_3 - C_5$ olefins, is well known in the art. For example, U.S. Pat. No. 2,398,253 discloses alkylation of phenol with $C_8 - C_{12}$ polymers of n-butene in the presence of $BF_3$ catalyst, with short reaction time, and at a reaction temperature not exceeding about 160° F. The patent further teaches that use of high temperatures, long contact times, and more than equal molar proportions of phenol lead to formation of low molecular weight products and/or dialkyl phenols.

U.S. Pat. No. 2,655,544 discloses the alkylation of phenol with propylene polymer at about 85° to 125° F with 3% $BF_3$ as catalyst to obtain a yield of about 85% of alkyl phenol having about 21 carbon atoms in the alkyl group. Use of polymers of isobutylene in the alkylation, for example tetraisobutylene, resulted in fragmentation of the polymer, and the princial product obtained was octyl-phenol rather than the expected $C_{16}$ alkyl phenol.

British Pat. No. 1,159,368 discloses the alkylation of phenol with $C_{50}$ and higher polymers and copolymers of propylene and butylene in the presence of $BF_3$ catalyst and at a temperature below about 150° F. Yields of alkylated phenol, based on polymer, care substantially below 100% because the double bond required for the alkylation reaction is present in about only 75% of the polymer molecules. In addition, polymer fragmentation during reaction is a problem and is controlled, but not eliminated, by conducting the reaction at temperatures preferably not above about 120° F.

SUMMARY OF THE INVENTION

We have now found that phenol can be alkylated with a high molecular weight ethylene-propylene-diene terpolymer to a hydroxylphenyl-substituted terpolymer in essentially quantitative yields based on terpolymer and with essentially no terpolymer fragmentation by treating the terpolymer with about 50 to about 100 moles of phenol for each mole of terpolymer, in the presence of $BF_3$ as a catalyst in amounts ranging from about 0.05 to about 0.20 moles of $BF_3$ for each mole of phenol, at a reaction temperature of about 170° to about 300° F and thereafter removing unreacted $BF_3$ and phenol. The use of diene-containing terpolymer assures that a least one double bond will be present in each polymer molecule and will be available for the alkylation reaction. Thus, under the above-specified reaction conditions each polymer molecule will react with at least one phenol molecule, thereby providing an essentially quantitative yield of alkylation product based on polymer. Preferably, the terpolymers for use in this invention contain multiple olefinic reaction sites, advantageously about 2 to about 5 double bonds for each 1000 carbon atoms in the polymer chain. Suitable terpolymers contain about 35–65 mole percent propylene, 35–70 mole percent ethylene, and up to about 10 mole percent of an aliphatic diolefin containing from about 4 to about 25 carbon atoms, for example 1,4-butadiene, 1,3-hexadiene, 1,4-pentadiene, 2-methyl-1,5-hexadiene, 1,7-octadiene, dicyclopentadiene, etc. The preferred terpolymers contain about 35–45 mole percent propylene, about 65–55 mole percent ethylene, and about 1.0 to about 2.5 mole percent of 5-alkenyl-2-norbornene, for example 5-ethylidene-2-norbornene, and have number average molecular weights (hereinafter $\overline{M}_n$) in the range of about 20,000 to about 25,000. Surprisingly, we have found that with such terpolymers alkylation temperatures as high as 300° F can be employed with no evidence of terpolymer fragmentation.

Preparative methods for suitable ethylene-propylene-diene terpolymers are well known in the art. For example, preparation of an ethylene-propylene-aliphatic diolefin terpolymer, such as ethylene-propylene-hexadiene terpolymer, is taught in U.S. Pat. No. 2,933,480. The preparation of ethylene-propylene-dicyclopentadiene terpolymers is taught in U.S. Pat. No. 3,000,866. The preferred ethylene-propylene-2-alkenyl-5-norbornene terpolymers, particularly ethylene-propylene-2-ethylidene-5-norbornene terpolymer, are prepared by copolymerizing ethylene, propylene, and the 2-alkenyl-5-norbornene in tetrachlorethylene solution at a temperature of 20°–60° C in the presence of catalytically effective amounts of (iso-butyl)$_3$Al and VOCl$_3$ as disclosed in U.S. Pat. No. 3,093,620.

The terpolymer alkylated phenols have utility as intermediates in the preparation of various multifunctional addition agents for lubricating oils by methods well known in the art. For example, effective detergent-dispersants can be prepared by sulfurizing the terpolymer alkylated phenol followed by neutralization with a metal oxide or hydroxide to form the metal salt. Advantageously, alkaline earth salts such as barium and calcium salts can be prepared and utilized in this manner.

Alternatively, the terpolymer alkylated phenols can be converted to ashless dispersants by the Mannich Reaction with formaldehyde and a polyamine. For example, terpolymer alkylated phenol, formaldehyde, and a polyamine, such as bis-aminopropyl piperizine, in molar proportions of 1:30:20, react at a temperature in the range of about 120° F to about 300° F to provide a novel ashless dispersant for lubricating oils.

Lubricant addition agents derived from terpolymer alkylated phenols of this invention have the additional benefit of improving the viscosity index of the lubricant since the $\overline{M}_n$ of the terpolymer is in the range of about 20,000 to about 40,000 which is sufficiently high for viscosity index improving purposes.

DESCRIPTION OF THE PREFERRED EMBODIMENTS

The preferred method for alkylating phenol with terpolymer comprises the steps of:

a. dissolving about 5% by weight of terpolymer in a solventextracted SAE 5W lubricating oil by heating the mixture at 300°–320° F under a blanket of nitrogen, b. cooling the terpolymer solution to about 180° F and adding rapidly thereto a 100 mole excess of phenol·BF$_3$ complex wherein the mole ratio of phenol to BF$_3$ is about 1:0.1, c. heating the reaction mixture for two hours at 180°–200° F, and d. stripping unreacted phenol and $BF_3$ by heating the mixture to 440°–460° F while passing a stream of nitrogen through the reaction mixture.

The data for a number of alkylation runs utilizing an ethylene-propylene-5-ethylidene-2-norbornene terpolymer having a $\overline{M}_n$ between about 20,000 and 25,000 dissolved in a solvent-extracted SAE 5W oil having a viscosity at 210° F of 45SSU are listed in Table 1.

about 5 mole percent of said 5-alkenyl-2-norbornene, said terpolymer having a $\overline{M}_n$ in the range of about 20,000 to about 30,000.

4. The process of claim 3 wherein the terpolymer consists essentially of 35–45 mole percent propylene, about 65–55 mole percent ethylene, and about 1.0 to about 2.5 mole percent of 5-ethylidene-2-norbornene, said terpolymer having a $\overline{M}_n$ in the range of about 20,000 to about 25,000.

TABLE I
ALKYLATION OF PHENOL WITH HIGH MOLECULAR WEIGHT TERPOLYMER

| Terpolymer, $\overline{M}_n = 20{,}000 - 25{,}000$ C=C/1000C | Mole Ratio Phenol . $BF_3$ Complex/ Terpolymer | $BF_3$/ Phenol | Alkylation Temp. ° F | Terpolymer Phenol in Oil Concentration, %[1] | Yield on Terpolymer, % | Dil. Vis., SSU at 210° F[2] |
|---|---|---|---|---|---|---|
| 2.45 | 100 | 0.10 | 200–210 | 5.1 | 102 | 54.2[3] |
| " | " | " | " | 5.3 | 106 | — |
| " | " | " | " | 5.7 | 114 | 53.6 |
| 4.14 | " | " | " | 4.8 | 96 | — |
| 2.50 | 90 | " | 170–190 | 5.7 | 114 | 54.8[4] |
| " | 100 | " | " | 4.2 | 94 | 55.7 |
| " | " | " | 200–220 | 4.8 | 96 | 54.7 |
| " | 50 | " | 170–180 | 2.8 | 56 | — |
| " | 100 | 0.05 | 170–190 | 1.3 | 26 | — |
| " | 50 | 0.20 | 170–200 | 4.4 | 88 | — |
| " | 100 | " | " | 5.2 | 104 | — |
| 5.0 | " | 0.10 | " | 4.4 | 88 | — |
| " | 50 | " | 170–175 | 3.2 | 64 | — |
| " | 100 | " | 270–290 | 2.3 | 46 | 53.0 |

[1] Concentration of terpolymer phenol in oil was determined by passing a measured amount of the reaction mixture through a column of silica gel (Grace Chemical Company, Grade 62, 60–200 mesh) which retains the hydroxy-phenyl terpolymer. This is followed by elution of adsorbed terpolymer phenol with hexane. Upon removal of hexane, the amount of hydroxy-phenyl terpolymer is determined for calculation of concentration and yield. Such adsorption and hexane elution is a convenient method for isolating the hydroxy-phenyl terpolymer.
[2] 10 parts Terpolymer Phenol in oil diluted with 90 parts oil having a viscosity at 100° F of 150 SSU.
[3] Terpolymer before alkylation had 53.0 Dil. Vis.
[4] Terpolymer before alkylation had 54.7 Dil. Vis.

The data show that yields, based on terpolymer, in excess of 100% were obtained in the process of this invention. In addition, the viscosity data indicate that no measurable fragmentation of the terpolymer occurred.

The invention has been described in detail with particular reference to certain preferred embodiments thereof, but it is understood that variations and modifications can be effected within the spirit and scope of the appended claims.

We claim:

1. A process of preparing a high molecular weight ethylene-propylene-diene terpolymer having 1 to 5 pendant hydroxyphenyl groups conprising reacting an ethylene-propylene-diene terpolymer of from 10,000 up to 40,000 Mn whose units consist essentially of from 1 up to 10 mole percent of a $C_4$ to $C_{25}$ diene hydrocarbon or a 2-($C_2$-$C_5$ alkenyl)-2-norborene and whose remaining 99–90 mole percent units consist of 35 to 70 mole percent ethylene and from 65 to 30 mole percent propylene units, with about 50 to about 100 moles of phenol for each mole of terpolymer, in the presence of $BF_3$ as a catalyst in amounts in the range of about 0.05 to about 0.20 moles of $BF_3$ for each mole of phenol, at a reaction temperature of about 170° F to about 300° F, and thereafter removing unreacted $BF_3$ and phenol.

2. The process of claim 1 wherein the terpolymer consists essentially of about 30–65 mole percent propylene, 35–70 mole percent ethylene, and up to about 10 mole percent of a diene selected from the group consisting of aliphatic diolefins containing from about 4 to about 25 carbon atoms, and 5-alkenyl-2-norbornenes wherein the alkenyl group contains from about 2 to about 5 carbon atoms, said terpolymer having a $\overline{M}_n$ of about 20,000 to about 40,000.

3. The process of claim 2 wherein the terpolymer consists essentially of about 35–45 mole percent propylene, about 55–65 mole percent ethylene, and about 1 to 5. The process of claim 3 wherein the mole ratio of phenol to terpolymer is about 100:1, the mole ratio of $BF_3$ to phenol is about 0.10:1, and the temperature is in the range of about 170° F to about 210° F.

6. A process for preparing a high molecular weight terpolymer substituted phenol comprising the steps of:
   a. dissolving about 5% by weight of said terpolymer in lubricating oil by heating the mixture at 300°–320° F while bubbling an inert gas through the mixture, said terpolymer consisting essentially of about 35–45 mole percent propylene, about 65–55 mole percent ethylene, and about 1.0–2.5 mole percent 5-ethylidene-2-norbornene and having a molecular weight in the range of about 20,000 to about 25,000,
   b. cooling the polymer solution to 180° F and adding rapidly thereto about 100 mole excess of phenol containing about 0.10 moles $BF_3$ for each mole of phenol,
   c. heating the mixture of step (b) at 180°–200° F for two hours, and
   d. finishing the reaction by stripping unreacted phenol and $BF_3$ with a stream of inert gas for about two hours at a temperature of about 440°–460° F.

7. A high molecular weight hydroxy-phenyl substituted hydrocarbon comprising a backbone terpolymer having from 1 up to 5 pendant hydroxy phenyl groups wherein said terpolymer backbone has a $\overline{M}_n$ in the range of from 10,000 up to 40,000, from 0 up to 4 olefinic double bonds in its chain for each 1,000 carbon atoms, and consists essentially of polymer units derived from ethylene, propylene, and a diene consisting of a $C_4$ to $C_{25}$ diene hydrocarbon or a 5-alkenyl-2-norbornene whose alkenyl substituent contains from 2 to 5 carbon atoms wherein from 1 to 10 mole percent of the polymer units are derived from the diene and the remaining 90 to 99 mole percent are from 35 up to 70 mole percent ethylene and from 30 up to 65 mole percent propylene units.

8. The hydroxy-phenyl substituted terpolymer of claim 7 wherein 1 to 5 mole percent of the terpolymer units are provided by said 5-alkenyl-2-norbornene and the remaining polymer units consist of 65 to 55 mole percent ethylene and 35 to 45 mole percent propylene units and the backbone terpolymer has a $\overline{M}_n$ of from 20,000 up to 30,000.

9. The hydroxy-phenyl substituted terpolymer of claim 7 wherein 1.0 to 2.5 mole percent of the terpolymer units are provided by 5-ethylidene-2-norbornene and the remaining polymer units consist of 65–55 mole percent ethylene, and about 35–45 mole percent propylene units and the backbone terpolymer has a $\overline{M}_n$ of from 20,000 up to 25,000.

* * * * *